(12) United States Patent
Romao

(10) Patent No.: US 6,650,189 B1
(45) Date of Patent: Nov. 18, 2003

(54) MOBILE DEVICE AND METHOD FOR THE MANAGEMENT OF A STANDBY MODE IN A MOBILE DEVICE OF THIS KIND

(75) Inventor: Fernando Romao, Montesson (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/541,412

(22) Filed: Mar. 31, 2000

(30) Foreign Application Priority Data

Apr. 1, 1999 (FR) ............................................. 99 04099

(51) Int. Cl.[7] ............................ H03B 27/00; H04B 7/00
(52) U.S. Cl. .............................. 331/49; 331/74; 331/46; 327/144; 713/322; 713/323; 713/500; 455/574
(58) Field of Search ......................... 455/89, 343, 574; 331/49, 74, 46; 327/144; 713/322, 323, 500

(56) References Cited

U.S. PATENT DOCUMENTS

| 4,613,829 A |   | 9/1986 | Ott .............................. 331/59 |
| 5,369,377 A | * | 11/1994 | Benhamida ............. 331/108 D |
| 5,729,722 A |   | 3/1998 | Matsumoto ................. 395/560 |
| 5,737,588 A |   | 4/1998 | Maeda et al. ............... 395/555 |
| 6,029,061 A | * | 2/2000 | Kohlschmidt ............... 455/343 |

FOREIGN PATENT DOCUMENTS

| DE |    3446227 | 6/1986 |
| EP |  0 586 256 | 3/1994 |
| EP |  0 865 159 | 9/1998 |
| GB |  2 308 469 | 6/1997 |
| GB |  2 315 578 | 2/1998 |
| GB |  2 320 398 | 6/1998 |
| GB |  2 329 795 | 3/1999 |
| WO | WO 98/00829 | 1/1998 |

* cited by examiner

*Primary Examiner*—Arnold Kinkead
(74) *Attorney, Agent, or Firm*—Patterson, Thuente, Skaar & Christensen, L.L.C.

(57) ABSTRACT

An RC type oscillator (10) is integrated into a processor circuit (2) of a mobile device (1). This oscillator is used to set the pace of the activity of the processor circuit during periods when the mobile device is on standby. The frequency drift due to the temperature variations of the oscillator is concerted by a regular calibration of the oscillator by a faster oscillator recognized to be stable. This embodiment gives gain in space and a reduction in cost.

6 Claims, 2 Drawing Sheets

MOBILE DEVICE AND METHOD FOR THE MANAGEMENT OF A STANDBY MODE IN A MOBILE DEVICE OF THIS KIND

BACKGROUND OF THE INVENTION

1. Field of the Invention

An object of the invention is a mobile device and a method for the management of a standby mode in a mobile device of this kind. The field of application of the invention is preferably that of mobile telephony. However, the invention can also be applied in any other field using integrated circuits and involving several modes of operation, such as for example the field of portable or laptop computers. The aim of the invention is to reduce the amount of space required by the circuits contained in a mobile device as well as their cost price.

2. Description of the Prior Art

At present, one of the main characteristics of mobile telephones is their autonomy in standby mode. This autonomy depends inter alia on the power consumption of the telephone in this mode. When a telephone is in standby mode, a mobile telephone listens to the network in order to find out if whether it is receiving an incoming call. These listening operations take place at points in time or dates planned by the network and communicated by the network to the mobile telephone. Between two consecutive dates, the mobile telephone has but very few or no processing operations to perform. All it has to do is to ensure that it is ready for the next listening operation. It therefore has to measure a period of time.

At present, the modes, whether active or standby, are managed by one and only one very large-scale integrated circuit. This circuit is connected to two quartz crystals, one with a high frequency of typically 13 MHz, and the other with a low frequency of typically 32 KHz. The very large-scale integrated circuit can work at both these frequencies. In the active mode, the very large-scale integrated circuit has many processing operations to perform and is subjected to heavy time constraints. It therefore has its pace set by the 13 MHz quartz crystal. This implies high consumption. In the standby mode, the integrated circuit has few processing operations to perform and the time constraints are relaxed. It therefore switches into a lower-grade mode of operation and has its pace set by the 32 KHz quartz crystal. This has the effect of reducing consumption, for example by the ratio of the frequency of the two quartz crystals. The mobile telephone is in active mode during a listening operation. It is in standby mode between two successive listening operations.

The problem encountered in an embodiment of this kind is related to the nature of the slow oscillator. This slow oscillator is a quartz crystal, namely a block of quartz with a defined shape that is placed between two electrodes. When a voltage is applied to these electrodes, a mechanical deformation of the quartz crystal is obtained. The quartz crystal then goes into oscillation and delivers a signal at the frequency for which the system has been calibrated. For a given frequency, a system of this kind has a minimum space requirement. Consequently, the use of a quartz crystal hampers integration since a quartz crystal of this kind cannot be integrated.

Furthermore, quartz crystals are precision systems. Indeed, it is they that set the pace of the work of the mobile telephone and synchronize it with the network. Making a quartz crystal entails the application of costly technologies to meet demanding specifications, and this increases the total cost of the mobile telephone.

The invention resolves these problems by replacing the quartz crystal with an RC type oscillator delivering a signal with a frequency identical to that of a signal delivered by a quartz crystal. Oscillators of this kind are made with mastered technologies and accept total integration. Thus, a very substantial gain in space is obtained for zero cost. Indeed, the oscillator is integrated into a total integrated circuit and brings only a few transistors into play. A total integrated circuit for its part has several hundreds of thousands of transistors and the addition of these few transistors does not alter its cost.

SUMMARY OF THE INVENTION

An object of the invention therefore is a mobile device comprising:

a processor integrated circuit needed to implement the activity of the mobile device, means to place this device in standby mode and active mode, two oscillators to set the pace of the processor integrated circuit, a first slow oscillator useful in a standby mode, and a second fast oscillator useful in an active mode, wherein the slow oscillator is an RC type oscillator.

An object of the invention is also a method for the management of a standby mode of a mobile device wherein:

the device is made to work in active mode by means of a fast oscillator recognized to be stable, for a standby mode of the device, there is provided a date of activation of the device, this date being stored in a register, parameters useful for the management of the standby mode are computed, and the parameters are stored in a memory, the device is placed in standby mode and then the device is repositioned in active mode on the planned date of activation by means of a slow oscillator, wherein just before a passage into standby mode and regularly during this standby mode:

a slow RC oscillator is calibrated with the fast oscillator, the result of the calibration is stored in a register, a duration of inter-calibration is planned, the slow RC oscillator is calibrated again at the end of the inter-calibration period.

BRIEF DESCRIPTION OF THE DRAWINGS

The present invention will be understood more clearly from the following description and the appended figures. These figures are given purely by way of an indication and in no way restrict the scope of the invention. Of these figures.

MORE DETAILED DESCRIPTION

Figure 1:
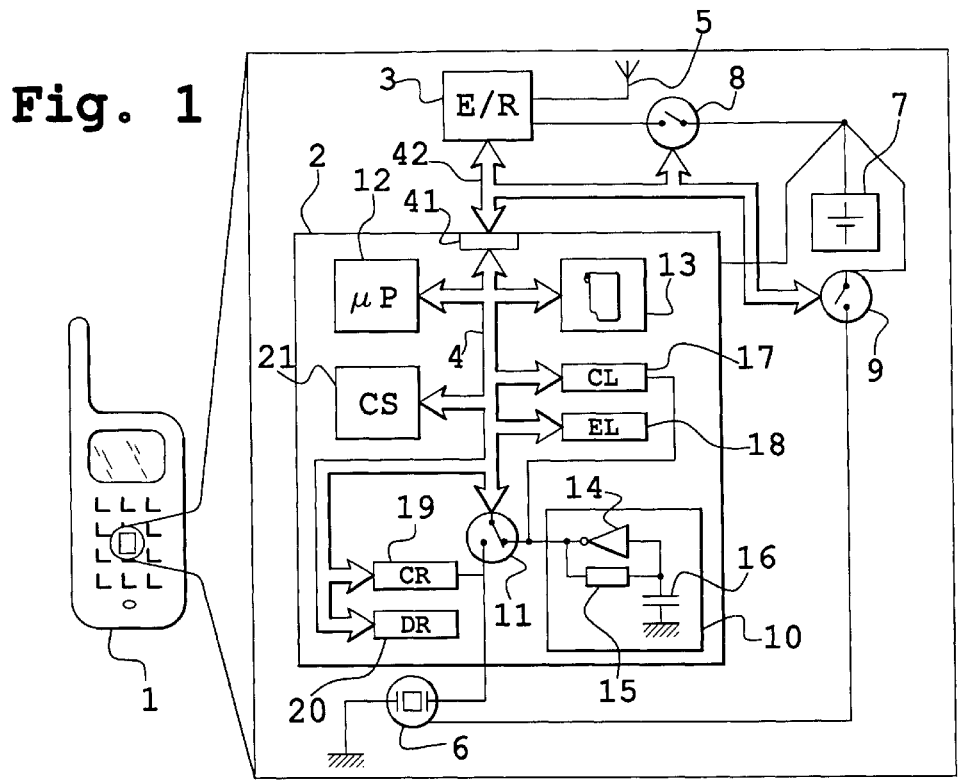
FIG. 1 is a view of a mobile device according to the invention and the main elements that it comprises, especially a first RC type oscillator.

FIG. 1 shows a mobile device 1 according to the invention. To simplify the explanation, the device 1 is herein a mobile telephone. The telephone 1 has a processor integrated circuit 2. The circuit 2 is connected to a transmission/reception management circuit 3 by an internal bus 4, a port 41 of the integrated circuit 2 and an external bus 42. The circuit 3 is connected to an aerial 5 enabling the mobile telephone to send and receive RF signals. A fast quartz oscillator 6 is connected to the bus 4 of the integrated circuit 2. A power supply unit 7 gives the power needed for the circuit 2, the circuit 3 and the oscillator 6. The telephone 1, between the supply unit 7 and the circuit 3, has a switch 8 and, between the supply unit 7 and the oscillator 6, it has a switch 9. The control inputs of the switches 8 and 9 are connected to the bus 42. The switches may however be contained in the circuit 2. These switches 8 and 9 are used, when the mobile telephone is being put into standby mode, to cut off the circuits that are of no utility in the management of the standby mode, or have a reduced or occasional utility.

The depiction of the means for placing the oscillator 6 and the circuit 3 in standby mode is diagrammatic. In practice, the switches 9 and 8 may be transistors.

FIG. 1 also shows that the integrated circuit 2 comprises, according to the invention, an RC type slow oscillator 10 connected to a terminal of a selector 11. Through another terminal, the selector 11 is connected to the oscillator 6. Through an output, the selector 11 is also connected to the microprocessor 12 by means of the bus 4.

The slow oscillator 10, in one example, has an inverter 14 whose input is connected to the output by a resistor 15. The input of the inverter 14 is also connected to a ground by a capacitor 16. The output signal of the oscillator 10 is the output signal of the inverter 14. The output of the inverter 14 is connected to the first terminal of the selector 11. In this example, the slow oscillator has a maximum of ten transistors. It is integrated into the circuit 2.

The working of the oscillator 10 is simple. When the power is turned on, the capacitor 10 is discharged, and hence the voltage at the input of the inverter 14 is zero. The output of the inverter 14 is taken to a high voltage Vmax. The capacitor 16 then gets charged through the resistor 15 until a voltage VH is reached. At this voltage VH, the inverter 14 switches over to make its output go to zero. The capacitor 16 then gets discharged until a voltage VB is reached. At this voltage VB, the inverter 14 switches over again to make its output go to Vmax. The signal obtained is therefore a square-wave signal with an amplitude equal to Vmax and a cycle time equal to the charging and discharging time of the capacitor 16 between the voltages VH and VB. VH is higher than VB.

The mode management programs executed by the microprocessor 12 are stored in a memory 13 connected to the microprocessor 12 by the bus 4. The memory 13 also contains a data and working zone of the microprocessor 12. Hereinafter, it is clear that the actions performed by the microprocessor 12 are performed under the control of a general operating program contained in the memory 13.

The bus 4 contains an address bus, a data bus, a control bus and a power supply bus. A clock signal coming from the fast oscillator 6 or the slow oscillator 10, depending on the position of the selector 11, is taken to the microprocessors 12 and to the other circuits that need it by means of the control bus. This control bus contains a connection whose purpose is to convey this clock signal. In one example, the microprocessor 12 acts on the selector 11 by selecting this selector by means of the address bus, sends it a command through the data bus and validates this command through the control bus. The selector 11 then acknowledges two commands: one to go from the fast oscillator 6 to the slow oscillator 10, and the other to go from the slow oscillator 10 to the fast oscillator 6. Other control devices may be envisaged.

FIG. 1 also shows a slow counter 17. This counter 17 is connected to the oscillator 10 whose cycles it counts. This counting is used to measure a period which is then assessed in terms of numbers of cycles of the slow oscillator 10. A register 18 contains the result of the calibration of the oscillator 10 by the oscillator 6. This calibration is done by means of a fast counter 19. The counter 19 is connected to the oscillator 6 and counts cycles of this fast oscillator 6. To calibrate the oscillator 10, it is enough to place the counter 19 at zero and then activate the counter 19 between two leading edges of the signal of the oscillator 10 for example. Then, the result obtained is the number of cycles of the fast oscillator 6 contained in a cycle of the slow oscillator 10.

Finally, a register 20 is used to store the value of a duration expressed in terms of numbers of cycles of the fast oscillator 6. These registers and counters numbered 17 to 20 can furthermore be read accessed and write accessed by the bus 4. At a given time, there is only one clock signal present at the clock connection of the bus 4. However, it may be necessary to perform a slow counting operation and a fast counting operation. In this case, the selector 11 is slightly more complex in order to make the two clock signals available simultaneously, or else each counter is connected directly to the oscillator whose cycles it counts. The principle of the invention therefore remains the same. The counters 17 and 19 have all the characteristics of known counters. They may be activated and stopped at will, get incremented or decremented at will. The counting is done at the pace of the oscillator to which they are linked.

In the example, the telephone in put into standby mode by powering off unnecessary elements such as the circuit 3 or the oscillator 6 as well as by powering off the peripheral circuits which are not shown, such as a keyboard, a screen and a microphone. When this standby mode is turned on, the microprocessor 12 switches the integrated circuit 2 from an operation whose pace is set by the oscillator 6 into an operation whose pace is set by the oscillator 10. The unnecessary element shown are then powered off by means of the switches 8 and 9. The switch-over from the oscillator 6 to the oscillator 10 is done by means of the selector 11. The power saving thus obtained is significant but may be further improved.

Indeed, the circuit 2 contains hundreds of thousands of transistors which, since they are supplied with power, continue to dissipate power. Thus, in one variant of the invention, a circuit 21 specialized in the management of the standby mode is integrated into the circuit 2. The circuit 21 is connected to the bus 4. Each function performed by the microprocessor 12 of the circuit 2 has a switch provided on a connection supplying power to circuits necessary for this function. This makes it possible to selectively power off various functions of the circuit 2. When the device is put on standby, in addition to the switch-over to a slow operating pace set by the oscillator 10, the power supply to all the functions of the circuit 2 that are not used to manage the standby mode is cut off. The switches thus integrated amount to only a few tens of additional transistors. They are controlled by means of the bus 4.

One improvement consists in delaying the fast signal by a quarter period and applying the same counting principle to the leading and trailing edges. Thus, a factor of improvement equal to four is obtained in the counting.

Figure 2:
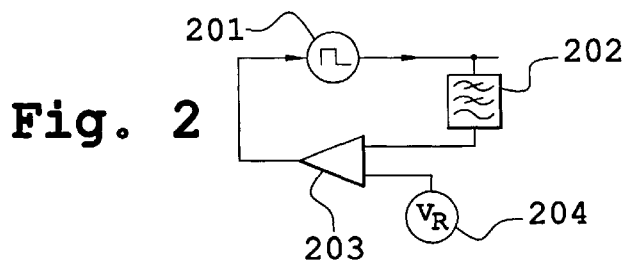
FIG. 2 is a second exemplary RC type oscillator.

The problem of the oscillator 10 is that its frequency drifts greatly as a function of the temperature. FIG. 2 shows a variant of an RC type voltage-controlled oscillator 201 that suffers from this drawback to a lesser degree. The output of the oscillator 201 is connected to the input of a circuit 202 comprising a detector and a lowpass filter. The circuit 202 acts like an averaging filter. The signal that comes out of the oscillator 201 is a square-wave signal. The circuit 202 gives an average of this signal to the comparator 203. The circuit 202 is therefore a simple example of a frequency-voltage converter. The output of the circuit 202 is connected to a first input of a comparator 203. A second input of the comparator 203 is connected to a reference voltage generator 204. The output signal of the comparator 203 is proportional to the difference between the output signal of the circuit 202 and the reference voltage. The output of the comparator 203 is connected to the control input of the oscillator 201.

The oscillator of FIG. 2 can replace the oscillator 10. However, its integration requires more components than in the case of the oscillator 10. The value of the oscillator of FIG. 2 lies in the fact that it undergoes a far lower degree of temperature drift than the oscillator 10. There are indeed known ways of making reference voltages that are highly stable under temperature.

So as not to undergo fast temperature variations within the chip of the circuit, it is possible to move the RC pair out of the integrated circuit. The thermal time constants are then greatly increased, in fact from a few seconds to a few minutes.

Figure 3:
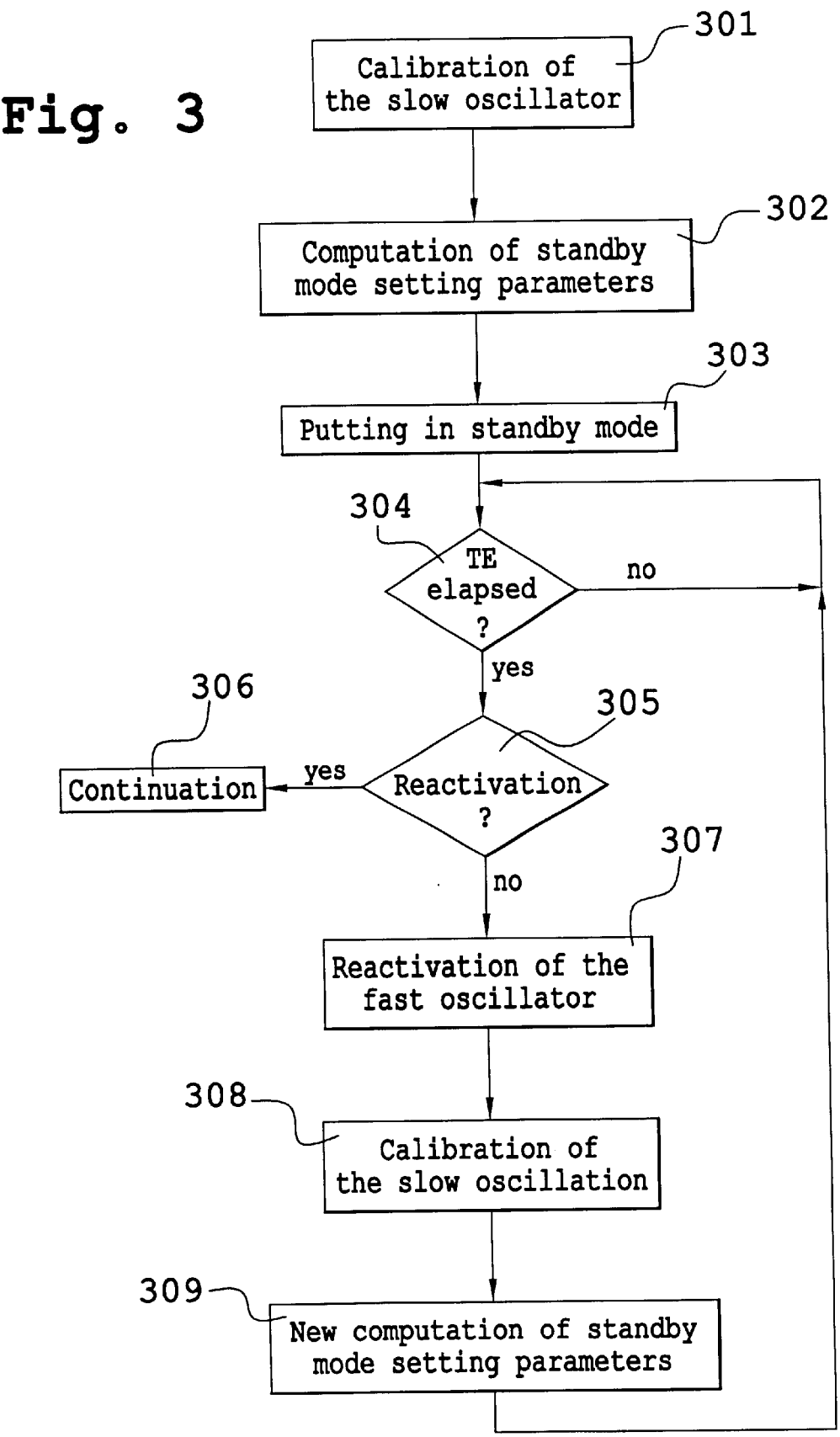
FIG. 3 illustrates steps of the method according to the invention.

FIG. 3 illustrates steps of the method of the invention that succeed one another from the time when the telephone is put into standby state. The switches 9 and 8 are first of all in a closed position. The circuit 2 then has its pace set by the oscillator 6. In a step 301, the oscillator 10 is calibrated. To this end, the counter 19 is set at zero. Then, a leading edge of the oscillator 10 is awaited. This leading edge may be detected for example during a change in value of the counter 17. As soon as the leading edge of the oscillator 10 is detected, the counter 19 is started. Then, a leading edge following the signal of the oscillator 10 is awaited in order to stop the counter 19. Once the counter 19 has been stopped, its value is read and stored in the register 18.

The operation then passes to a step 302 for computing the standby mode setting parameters. In the step 302, a computation is done, in particular, of a duration TS during which the telephone must be put into standby mode. The duration TS is converted into a number of known and stable cycles of the fast oscillator 6. If TS is expressed in seconds, then the conversion is done by multiplying TS by the frequency of the oscillator 6. The result is stored in the register 20.

Then, a duration TR of inter-calibration of the oscillator 10 is determined. Indeed, the drift of a slow RC oscillator, even if it is temperature-stabilized, is far too great to consider its frequency as being constant throughout the duration TS. In practice, the duration TS is about 400 milliseconds to two seconds whereas the duration during which the frequency of the slow oscillator 10 may be considered to be stable is about 100 milliseconds at most. This inter-calibration duration TR is determined in such a way that it is smaller than the time between the date of its computation and the date of activation of the mobile telephone. The time needed to set the oscillator 6 at a stable frequency starting from a standby state is subtracted from the duration TR. This time needed in practice is about some milliseconds. Then, a duration TE is obtained. Then, the mobile telephone is activated at the end of the duration TE. The duration of TE is such that if there is a drift in the frequency of the oscillator 10, this drift remains monotonic.

The time TE is then converted into a number of cycles of the oscillator 10. This means that the time TE expressed in seconds is multiplied by the frequency of the oscillator 10 and the result is stored as a threshold of the counter 17. There is then a passage to a step 303 for putting the device into standby mode.

In the step 303, the switches 8 and 9 are switched into the open position. At the same time, the selector 11 is switched over so that the circuit 2 has its pace set by the oscillator 10. At the same time, the counter 17 is started. The activity of the mobile telephone is now the minimum and its consumption is reduced. The system goes into a step 304 pending the elapsing of the duration TE.

The following step 304 is a test of awaiting an event. In practice, the counter 17 gets incremented until it reaches its threshold value previously initialized in the step 302 at the value TE. Once the threshold is reached, the counter 17 activates an interruption which tells the microprocessor 12 that the processing must be resumed, at least in part. The operation then passes to a step 305 for testing the date of activation at the end of the duration TS.

In the test at the step 305, the threshold of the counter 17 is multiplied by the contents of the register 18. Thus, a period of time TP is obtained that separates the date of the test 305 from the date of a previous calibration. This period of time TP is subtracted from the contents of the register 20. This difference is stored in the register 20. The register 20 contains the time remaining until the activation date, at the end of the duration TS. If this remaining time is close, by some slow oscillating cycles, to the time needed to set up the stable frequency of the oscillator 6 in addition to a duration of activation of the mobile telephone, then the mobile telephone is activated. It is made to go completely from the standby mode into the active mode. The operation then goes into a known type of step 306 for activating the mobile telephone 1. Otherwise, it goes into a step 307 for activating the oscillator 6 alone.

In the step 307, the microprocessor 12 acts on the switch 9 to place it into a closed position. This has the effect of powering on the oscillator 6 and therefore making it start again. During the step 305 and during the setting up of the frequency of the oscillator 6, the counter 17 continues to get incremented. The setting-up time for the oscillator 6 is in the range of the duration of about a hundred cycles of the slow oscillator 10. Once these hundred or so cycles have elapsed, the counter 19 is activated it has been initialized at zero on a leading edge of the oscillator 10. Then, it is stopped on the next leading edge. This is a step 308 for a new calibration of the oscillator 10. In this way, at the end of the duration TE, the oscillator 10 is re-calibrated.

The operation then passes into a step 309 for a new computation of the standby mode setting parameters. The contents of the counter 17 are read and a number of cycles necessary for the performance of the step 309 is added to the number read. This last number of cycles is constant since these operations are always the same. The result of this addition is multiplied by the contents of the register 18. The result of this multiplication is subtracted from the contents of the register 20. The contents of the register 20 are updated on the basis of the result of this subtraction. The register 20 now contains the duration between the end of the current step 309 and the date of activation of the mobile telephone.

It is now necessary to determine a new inter-calibration time. To do so, the difference between the contents of the register 18 and the new contents of the counter 19 is computed. It may be said that a comparison is made between a new calibration and a previous calibration. The absolute value of the difference is taken and divided by a factor K. The factor K is chosen in such a way that the number obtained cannot be greater than a number N determined by laboratory measurements. The number obtained is used to index a table containing possible values of TE. In practice, the table contains tabulations of empirical values of TE for values of difference between two successive calibrations. On the basis of TE extracted from the table, it is possible to update the threshold of the counter 17. Then the register 18 is updated from the counter 19. The counter 17 is initialized at zero and started again. The operation then goes to the step 304 of waiting for TE to elapse.

This cycle continues until the step 305 determines that it is time to activate the mobile telephone.

The method of FIG. 3 has been described by means of counters 17 and 19 that get incremented. However, the same method could have been envisaged with counters that get decremented. Similarly, the actions are performed by the microprocessor 12. In one variant of the invention, they could be performed by the circuit 21.

Figure 4:
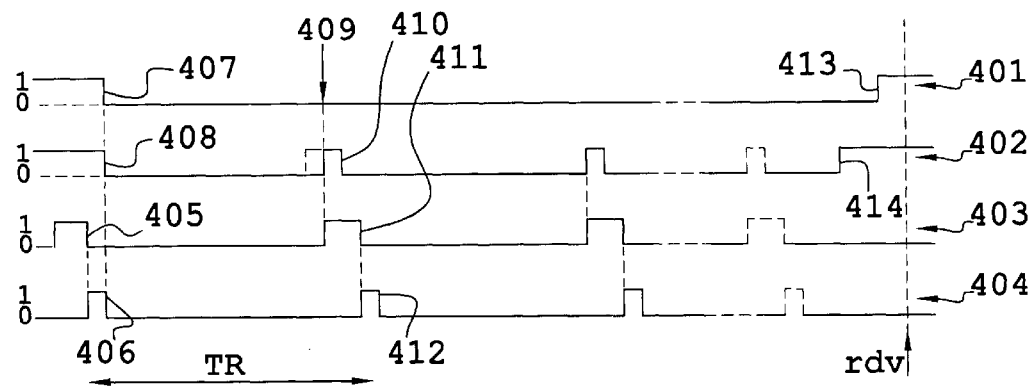
FIG. 4 shows timing diagrams pertaining to the synchronization of various events during a period of standby mode of a mobile telephone.

FIG. 4 is a timing diagram that illustrates the occupation and synchronization of the different elements, or steps, of the mobile telephone during a standby operation. A first line 401 shows the general activity of the mobile telephone and a second line 402 shows the general activity of the clock 6, a third line 403 shows the frequency and the duration of the calibration operations, a fourth line 404 shows the duration and the frequency of the computations of the parameters.of the standby mode.

Before the standby operation, a calibration 405 is done, followed by a computation 406 of the standby setting parameters and then by the operation 407 for putting the mobile telephone on standby, corresponding to the operation 408 for turning off the fast oscillator 6. After an inter-calibration duration TR and a duration for setting up the oscillator 6, namely at a date 409, the oscillator 6 is reactivated for a duration 410 that is slightly shorter than a duration of a following calibration 411. The end of calibration 411 corresponds to a computation 412 of the new parameters. The cycle is repeated until an activation 413 of the mobile telephone. This activation 413 is preceded by an activation 414 of the oscillator 6 to give the oscillator 6 time to get stabilized.

What is claimed is:

1. A mobile device comprising:
    a processor integrated circuit needed to implement activity of the mobile device,
    means to place this device in standby mode and active mode,
    two oscillators to set the pace of the processor integrated circuit, a first slow oscillator useful in a standby mode, and a second fast oscillator useful in an active mode, wherein:
        the slow oscillator is an RC type oscillator and is contained in the processor integrated circuit; and
        the device further comprises a memory register to store a measurement of frequency drift of the slow oscillator.

2. A device according to claim 1, wherein the slow oscillator has an inverter whose input is connected to a potential by a capacitor and whose output is connected to the input by a resistor.

3. A mobile device comprising:
    a processor integrated circuit needed to implement the activity of the mobile device,
    means to place this device in standby mode and active mode,
    two oscillators to set the pace of the processor integrated circuit, a first slow oscillator useful in a standby mode, and a second fast oscillator useful in an active mode, wherein:
        the slow oscillator is an RC type oscillator and is contained in the processor integrated circuit; and
        the slow oscillator comprises a voltage-controlled oscillator whose output is connected to a lowpass filter cascade-connected with a first input of a voltage comparator, a second input of the comparator being connected to a reference voltage generator, the output of the comparator being connected to the control input of the voltage-controlled oscillator.

4. A method for the management of a standby mode of a mobile device wherein:
    the device is made to work in active mode by means of a fast oscillator recognized to be stable,
    for a standby mode of the device, there is provided a date of activation of the device, this date being stored in a register,
    parameters useful for the management of the standby mode are computed, and the parameters are stored in a memory,
    the device is placed in standby mode and then the device is repositioned in active mode on the planned date of activation by means of a slow oscillator,
    wherein just before a passage into standby mode and regularly during this standby mode:
        a slow RC oscillator is calibrated with the fast oscillator,
        the result of the calibration is stored in a register,
        a duration of inter-calibration is planned,
        the slow RC oscillator is calibrated again at the end of the inter-calibration period.

5. Method according to claim 4, wherein
    the inter-calibration duration is provided for by means of a counter, and
    whenever the counter reaches a threshold:
        the fast oscillator is put into operation,
        the slow RC oscillator is calibrated with the fast oscillator,
        the result of the calibration is compared with that of a previous calibration and the duration of inter-calibration is adjusted as a function of the difference between these results, the greater the difference, the smaller being the duration of inter-calibration.

6. A mobile device having a standby mode and an active mode, the mobile device comprising:
    a bus;
    a microprocessor coupled to the bus;
    a selector coupled to the bus;
    a fast quartz oscillator coupled to the selector, the fast quartz oscillator setting the pace of the mobile device in the active mode; and
    an RC type slow oscillator coupled to the selector, the RC type slow oscillator setting the pace of the mobile device in the standby mode, wherein when the device enters the standby mode, the microprocessor actuates the selector to enable the RC type slow oscillator and when the device enters the active mode, the microprocessor actuates the selector to enable the fast quartz oscillator, the device further comprising a register, wherein a calibration value is stored in the register, the calibration value corresponding to a result of a calibration between the RC type slow oscillator and the fast quartz oscillator during the standby mode.

* * * * *

UNITED STATES PATENT AND TRADEMARK OFFICE
CERTIFICATE OF CORRECTION

| | |
|---|---|
| PATENT NO. | : 6,650,189 B1 |
| DATED | : November 18, 2003 |
| INVENTOR(S) | : Romao |

It is certified that error appears in the above-identified patent and that said Letters Patent is hereby corrected as shown below:

Column 1,
Line 24, delete "if".

Signed and Sealed this

Twenty-ninth Day of June, 2004

JON W. DUDAS
*Acting Director of the United States Patent and Trademark Office*